United States Patent [19]

Hull

[11] 3,863,185

[45] Jan. 28, 1975

[54] THERMAL BEAM ACTUATED ELECTRICAL SEQUENCER

[75] Inventor: Bradford N. Hull, Long Beach, Calif.

[73] Assignee: Robertshaw Controls Company, Richmond, Va.

[22] Filed: Dec. 17, 1973

[21] Appl. No.: 424,954

[52] U.S. Cl. .................. 337/44, 337/53, 337/87, 337/102
[51] Int. Cl. ........................................ H01h 61/00
[58] Field of Search ............ 337/39, 42, 44, 53, 85, 337/86, 87, 88, 89, 100, 102, 340; 307/112, 116

[56] References Cited
UNITED STATES PATENTS

| | | |
|---|---|---|
| 2,792,639 | 5/1957 | Hire .............................. 337/87 X |
| 2,870,290 | 1/1959 | Taylor et al. ..................... 337/44 |
| 3,229,064 | 1/1966 | Laing ............................. 337/87 X |
| 3,471,819 | 10/1969 | Gianola et al. ................... 337/87 X |

Primary Examiner—Arthur T. Grimley
Attorney, Agent, or Firm—Fulwider, Patton, Rieber, Lee & Utecht

[57] ABSTRACT

An electrical sequencer including an elongated heat conductive beam having thermal operators disposed at selected points along the length thereof and responsive to application of a predetermined level of current to one end thereof to provide heat travel along such beam at a controlled rate for providing sufficient temperatures at said respective operators in accordance with a predetermined sequence to provide for the desired sequential operation of such operators.

10 Claims, 6 Drawing Figures

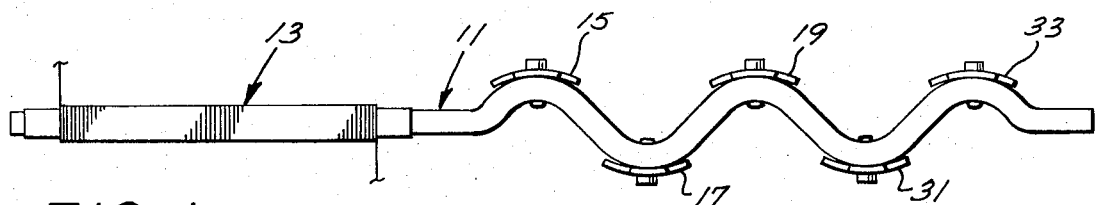
FIG. 1
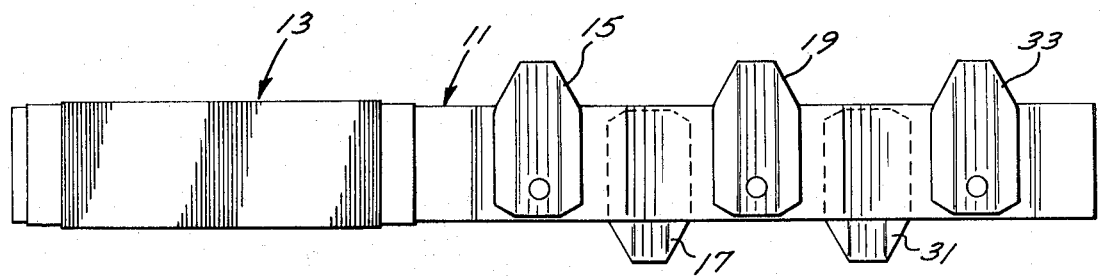
FIG. 2
FIG. 3
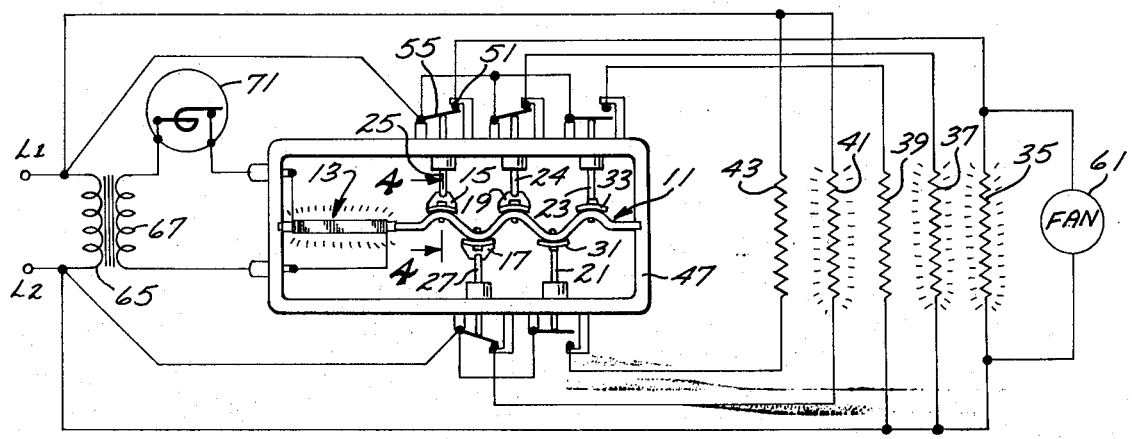
FIG. 4
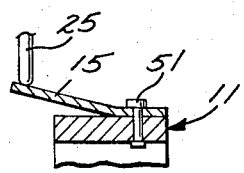
FIG. 5
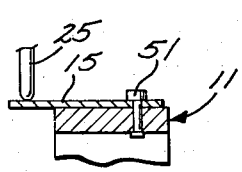
FIG. 6
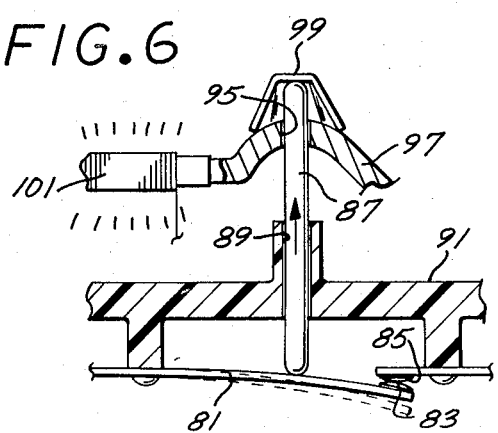

THERMAL BEAM ACTUATED ELECTRICAL SEQUENCER

BACKGROUND OF THE INVENTION

1. Field of the Invention:

The present invention relates to electrical sequencers for actuating a plurality of electrical components in a predetermined sequence.

2. Description of the Prior Art:

Many efforts have been made to provide economical and reliable electrical sequencers which will provide for actuation of plurality of electrical components in a desired sequence and which will also provide for a desired time delay between actuation of each such component. Prior art devices have been proposed which incorporate bimetallic operators which are responsive to different thermal temperatures to provide for sequential operation of controlled electrical components. A device of this type is shown in U.S. Pat. No. 3,713,062. Devices of this type suffer the shortcoming that each electrical operator must be of a different construction, thus adding materially to the cost of the device and the expense in storing inventory for manufacture thereof.

Other efforts have led to the provision of sequencers which incoporate cam drives having a plurality of cams located thereon and spaced in staggered relationship with respect to operators to be actuated whereby shifting of the cam results in sequential actuation of the operators. A device of this type is shown in U.S. Ser. No. 303,535, filed Nov. 3, 1972, and now U.S. Pat. No. 3,018,405, such patent being assigned to the assignee of the instant case. The electrical sequencer of the present invention offers the advantage that it is more economical to manufacture and still provides reliable performance.

SUMMARY OF THE INVENTION

The electrical sequencer of the present invention is characterized by an elongated thermally conductive electrical beam which is configured to control heat passage therealong at a predetermined rate. Thermal operators are located at selected points along the beam and are responsive to selected temperature levels to be rendered operative whereby such operators will be actuated in a predetermined sequence upon heating of such beam from one end thereof.

The objects and advantages of the present invention will become apparent from a consideration of the following detailed description when taken in conjunction with the accompanying drawings.

BRIEF DESCRIPTION OF THE DRAWINGS

FIG. 1 is a front view depicting an electrical beam incoporated in an electrical sequencer embodying the present invention;

FIG. 2 is a top view of the thermally conductive beam shown in FIG. 1;

FIG. 3 is an electrical sequencer employing the thermally conductive beam shown in FIG. 1, in reduced scale, and embodying the present invention;

FIGS. 4 and 5 are vertical sectional views taken along the lines 4—4 of FIG. 3 and depicting an electrical operator in its operative and inoperative positions, respectively; and FIG. 6 is a modification of the sequencer shown in FIG. 3.

DESCRIPTION OF THE PREFERRED EMBODIMENT

Referring to FIGS. 1 and 3, the electrical sequencer of the present invention includes, generally, an elongated serpentine aluminum beam 11 having a wire coil 13 wrapped about one end thereof for supplying current to such beam at a predetermined rate. Spaced along the length of the beam 11 are a plurality of bimetallic operators 15, 17, 19, 21 and 23 which are operative in response to a predetermined temperature level to operate respective switches 25, 27, 24, 21 and 23. The switches 25, 27, 29, 31 and 33 are connected in series with respective heating elements 35, 37, 39, 41 and 43. Consequently, energization of the coil 13 results in heat creeping along the aluminum beam 11 at a controlled rate, thus resulting in the temperatures of the operators 15, 17, 19, 31 and 33 being raised to their operative temperatures in a predetermined sequence which provides for a selected time delay between energization of the respective heating elements 35, 37, 39, 41 and 43.

The beam 11 may be made of any desired heat conductive material and may be of any generally elongated construction. The particular beam 11 is of rectangular shape and is formed in a generally serpentine configuration to provide for convenient mounting of the bimetallic blades forming the respective operators 15, 17, 19, 31 and 33. The opposite ends of the beam 11 are carried in a housing 47 which also carries the respective switches 25, 27, 24, 21 and 23. Referring to FIGS. 4 and 5, the bimetallic operators 15, 17, 19, 31 and 33 are affixed on their respective one ends to the beam 11 by means of rivets 51 and are constructed to normally assume the flat position shown in FIG. 5 but are responsive to predetermined temperature levels to cause their free ends to raise upwardly and assume the sloped position sbown in FIG. 4 for actuating the respective switches 25, 27, 24, 21 and 23. In the particular embodiment shown, the operators 15, 17, 19, 31 and 33 are of identical construction and are rendered operative at the same temperature level, thus resulting in the time delay between operation of such respective switches 25, 27, 24, 21 and 23 being controlled entirely by the particular configuration of the beam 11. However, for the purposes of the present invention, the operators 15, 17, 19, 31 and 33 may be constructed to operate at different temperature levels.

The switches 25, 27, 24, 21 and 23 are of the plunger type and incorporate respective movable and stationary contacts 55 and 51, the contacts of such switches being connected in parallel with one another but in series with the respective heating elements 35, 37, 39, 41 and 43.

Connected across the heating element 35 is a blower fan 61 for blowing air over the heating elements 35, 37, 39, 41 and 43 upon energization thereof to thus provide for forced air heating of the heated area and also serving to prevent overheating of such elements. In this regard, it will be noted that the fan 61 is connected across the first heater 35 to be actuated, thus resulting in actuation of such fan immediately upon energization of the first heating element.

A transformer primary coil 65 is connected across voltage source lines L1-L2 to supply current to the heating elements 35, 37, 39, 41, 43 and the fan motor 61. Connected in series between the transformer secondary coil 67 and heat motor winding 13 is a thermostat 71 having a bimetallic switch that is responsive to a selected environment temperature to close and actuate the heater 13 to commence actuation of the instant sequencer.

In operation, the sequencer of the present invention may be utilized to control energization of the heating elements in a multiple element electrical furnace and, in such instances, the winding 13 may be connected with a thermostat 71 mounted on the wall of a room of which the temperature is to be controlled. Thus, as long as the room temperature is maintained above a selected temperature, the switch in the thermostat 71 will remain open, thus leaving the winding 13 de-energized and, consequently, the furnace heating elements 35, 37, 39, 41 and 43 de-energized. However, when the temperature in the room falls below the selected level, the switch in the thermostat 71 will be closed, thus energizing the winding 13. Energization of the winding 13 commences heating of the left hand end of the thermal beam 11, thus initiating heat flow along such beam from left to right and, after a predetermined time, the temperature of the beam 11 at the location of the first bimetallic operator 15 will be raised sufficiently to transfer sufficient heat to such operator to cause flexture thereof to the position shown in FIG. 4, thus raising the plunger in the switch 25 upwardly to close the associated contact 55 on the stationary contact 51. Consequently, current flows form L1 through the first heating element 35 and concurrently through the blower fan motor 61 connected in parallel therewith to L2. Consequently, forced air heating of the room of which the temperature is being controlled will be initiated.

Assuming the heat from the first heater 35 is insufficient to prevent further dropping of the temperature in such room, the thermostat 71 will remain closed, thus continuing heating of the beam 11 and consequent further travel of heat along the length thereof to, after a predetermined time, raise the temperature of such beam at the location of the second bimetallic operator 17 to a level sufficient to cause flexture thereof and consequent closing of the second swtich 27 to thereby energize the second heating element 37 to thus provide additional heat to the room of which the environment is being controlled. Assuming the termperature of such room is still not raised to the desired level, heating of the beam 11 will be continued until all subsequent switches 24, 21 and 23 have been sequentially closed.

When the room has been heated sufficiently to raise the temperature of the thermostat 71 to a level resulting in opening thereof, the winding 13 will commence cooling thus enabling the beam 11 to also cool. However, there is sufficient residual heat in such winding 13 to maintain the left hand end of such beam 11 raised above the temperature of the right hand end thus causing the switches 23, 21, 24 27 and 25 to be sequentially opened, thereby resulting in the switch 25 being the last to open. Consequently, the first heating element 35 and blower fan 61 will be the last controlled components to be de-energized, thereby assuring that the fan 61 remains operative as long as any of the heating elements 35, 37, 39, 41 or 43 remain operative, thereby providing assurance against overheating of any of such elements as a result of premature de-energization of the fan 61.

The modification of the sequencer shown in FIG. 6 shows one of a series of switches incorporating electrically conductive spring blades 81 which are cantileverally mounted and formed to normally assume their closed positions with the contacts 83 adjacent the free end thereof in engagement with a stationary contact 85. A plunger 87 is telescoped through a bore 89 formed in the wall of the switch housing 91 to have one end in engagement with the intermediate portion of the flex blade 81 and the opposite end thereof projecting telescopically through a bore 95 in the thermal beam 97 to engage a bimetallic snap actuator 99. The snap actuator overlies the end of the plunger 87 and when unheated assumes the flattened broken line position shown in FIG. 6 to maintain the free end of the flex blade 81 biased downwardly and is responsive to heating of an electrical heat motor 101 wrapped about the end of the beam 97 to buckle upwardly against the resistance formed by the inherent configuration thereof until a predetermined amount of buckling is assumed, at which point the resistance to buckling is overcome and such bimetallic element snapped rapidly to its fully buckled position shown in FIG. 6, thus enabling the flex blade 81 to snap rapidly closed to engage the movable contact 83 with the stationary contact 85 thereby closing the switch.

Consequently, it can be seen that the sequencer modification shown in FIG. 6 maintains the actuated switch open while the heat motor 101 is de-energized, but is responsive to heating of such motor to close the switch, thereby taking the force applied to the bimetallic snap actuator 99 off such actuator to remove stresses therefrom, thus prolonging the useful life thereof.

From the foregoing, it will be apparent that the electrical sequencer of the present invention provides an economical and reliable means for operating a plurality of electrical components in a predetermined sequence and providing for a predetermined time delay between energization of the respective components.

Various modifications and changes may be made with regard to the foregoing detailed description without departing from the spirit of the invention.

What is claimed is:

1. An electrical sequencer for actuating a plurality of electrical components in a predetermined sequence and comprising:
  a housing;
  an elongated thermal beam supported from said housing and operative in response to heating of one end thereof to a predetermined temperature to provide respective selected temperatures in said predetermined sequence at a plurality of predetermined points along its length;
  a plurality of thermal operators disposed adjacent said respective points and responsive to said respective temperatures to be rendered operative;
  heating means for heating said one end of said beam to said predetermined temperature; and
  electrical current means connected with said operators whereby energization of said heating means causes said thermal beam to be progressively heated from said one end to cause said operators to be rendered operative in said predetermined sequence.

2. An electrical sequencer as set forth in claim 1 wherein:
  said operators include thermostatic strips.

3. An electrical sequencer as set forth in claim 1 wherein:
said operators are of substantially identical construction and are operative at the same temperatures.

4. An electrical sequencer as set forth in claim 1 wherein:
said electrical components are heating elements and one of said elements has a blower connected in parallel therewith for blowing fluid in heat exchange relationship with said heating elements and wherein:
said electrical circuit connects said one heating element with the first operator in the sequence.

5. An electrical sequencer as set forth in claim 1 wherein:
said beam is serpentine in shape; and
said operators are disposed at the apexes of the curves in said beam.

6. An electrical sequencer as set forth in claim 1 wherein:
said operators include thermostatic strips mounted on their respective one ends from said beam and operable upon being heated to said selected temperatures to cause the free ends thereof to flex through respective paths of travel, said operators further including respective switch means disposed in said respective paths of travel and responsive to flexture of said free ends through said paths to be rendered operative.

7. An electrical sequencer as set forth in claim 1 that includes:
said heating means including a coil of resistance wire wrapped on said one end of said beam.

8. An electrical sequencer as set forth in claim 1 for controlling heating components in a multiple element furnace and wherein:
said circuit means connects said respective operators in series with said respective heating elements and said sequencer further includes;
control means connected with said heating means and responsive to a selected low temperature to render said heating means operative.

9. An electrical sequencer as set forth in claim 1 wherein:
said beam includes a metal strip.

10. An electrical sequencer as set forth in claim 1 wherein:
said operators include respective thermostatic elements mounted from said beam with certain of said elements being mounted on one side of said beam and the remaining elements being mounted on the opposite side of said beam, said operators further including respective switch means operated by said elements with the switch means for said respective certain elements being mounted on said one side of said beam and the remaining switch means being mounted on said opposite side of said beam.

* * * * *

UNITED STATES PATENT OFFICE
CERTIFICATE OF CORRECTION

Patent No. 3,863,185            Dated January 28, 1975

Inventor(s) BRADFORD N. HULL

It is certified that error appears in the above-identified patent and that said Letters Patent are hereby corrected as shown below:

In the specification, Column 2, line 13, delete "29, and 31" and substitute therefor -- 24, 21 and 23 --. Same Column, line 38, delete "sbown" and substitute therefor -- shown --.

Signed and sealed this 24th day of June 1975.

(SEAL)
Attest:

RUTH C. MASON
Attesting Officer

C. MARSHALL DANN
Commissioner of Patents
and Trademarks